United States Patent Office 3,532,590
Patented Oct. 6, 1970

3,532,590
LAMINATED GLASS STRUCTURES
John Edward Priddle, Welwyn, England, assignor to Imperial Chemical Industries Limited, London, England, a corporation of Great Britain
No Drawing. Filed Feb. 3, 1967, Ser. No. 613,743
Claims priority, application Great Britain, Feb. 14, 1966, 6,389/66
Int. Cl. C03c 27/12; C09j 7/02
U.S. Cl. 161—183    15 Claims

ABSTRACT OF THE DISCLOSURE

Copolymers of ethylene with hydroxy or epoxy lower aliphatic esters of acrylic or methacrylic acid, and optionally a further comonomer, e.g. an alkyl ester of acrylic or methacrylic acid or vinyl acetate, used as interlayers for safety glass and the like.

---

This invention relates to ethylene copolymers. More particularly, it relates to ethylene copolymers having properties that render them particularly useful as interlayers for laminated glass, particularly safety glass, to glass laminates comprising the copolymers, and to articles thereof.

In accordance with the present invention we provide a copolymer of ethylene with one or more hydroxy or epoxy lower aliphatic monoesters of acrylic acid or methacrylic acid and with from 0% to 55%, by weight of the copolymer, of a further comonomer which is an ester of acrylic or methacrylic acid or a vinyl ester, said copolymer containing, by weight, at least 35% of ethylene and:

(a) from 1.0% to 8.5% of free hydroxy groups; or
(b) from 0.10% to 3.0% of epoxy oxygen; or
(c) both free hydroxy groups up to 8.5% and epoxy oxygen up to 3.0%, provided that— the weight of free hydroxy groups + (10× weight of epoxy oxygen) is always at least 1% by weight of the copolymer.

The invention further provides a glass laminate that includes at least one layer of glass and a layer of the said copolymer adhering thereto.

Increasing the free hydroxy content of the copolymer to above 8.5% by weight results in a copolymer that does not have the required combination of good flexibility, tensile strength and high energy to break over the service temperature range. Increasing the epoxy oxygen content to above 3% by weight results in excessive cross-linking, making the copolymer brittle and insufficiently thermoplastic to be useful as a laminated glass interlayer. Copolymers containing less than 1.00% of free hydroxy groups or 0.10% of epoxy oxygen, by weight, or less than an equivalently effective amount of the two together, give insufficient adhesion to glass surfaces.

The hydroxy or epoxy lower aliphatic radical of the ester, which may be a straight chain, branched chain or cyclic aliphatic radical, preferably contains from 2 to 6 carbon atoms, and is preferably a hydroxy or epoxy alkyl or hydroxy or epoxy cycloalkyl radical. It may, however, contain ether linkages, and it may contain one or more hydroxy or epoxy groups. The ester is preferably a hydroxy ester, and the hydroxyalkyl esters of acrylic and methacrylic acid are particularly preferred.

In general copolymers containing from 2.0% to 6.0%, by weight, of free hydroxy groups and/or from 0.3% to 1.0%, by weight, of epoxy oxygen, are the preferred copolymers of the present invention. With higher proportions the cost of the copolymer is increased, the impact performance of the copolymer is somewhat impaired and the copolymer tends to develop tackiness. With amounts of free hydroxy groups below 2.0% or of epoxy oxygen below 0.3% the copolymers have poor transparency; this may, however, be improved by including a further comonomer, as specified hereinbefore. The further comonomer is preferably vinyl acetate or an alkyl ester of acrylic or methacrylic acid. Methyl methacrylate and vinyl acetate are particularly suitable.

The invention is of particular value when used in the production of transparent safety glass, especially that of the type used for vehicle windscreens, especially for motor cars, and comprising two sheets of glass, which may be curved or flat, with a layer of transparent bonding medium sandwiched between them. It is also useful in the production of safety glass of the type comprising a sheet or sheets of glass bonded to a sheet of a transparent or translucent, substantially rigid plastic material. Such laminates, particularly those comprising a sheet of transparent, substantially rigid plastic material and a glass sheet bonded to each surface thereof, are used, for example, for bandit-resistant and bullet-resistant glass windows for shops, display cases, banks, vehicles and the like. The substantially rigid plastic material used in such laminates is preferably an acrylic plastic material, especially polymethyl methacrylate, rigid polyvinyl chloride, polystyrene, or a polycarbonate resin.

Copolymers preferred for use in making safety glass in accordance with the present invention include hydroxyethyl acrylate and hydroxyethyl methacrylate copolymers, especially the latter. Copolymers containing from 18% to 40% by weight of hydroxyethyl methacrylate (2.35% to 5.23% free hydroxy groups), the remainder being, essentially, ethylene, are especially suitable. These copolymers may combine the advantages of adhering to the right degree to glass and of giving high transparency, of having a refractive index close to that of glass, of having good flow properties for the manufacture of the laminated sheet, of being of a rubbery nature over a wide temperature range and of having other mechanical properties desirable in a safety glass interlayer, especially good shock absorption, high elongation, and flexibility at average outdoor temperatures. They have the further important advantage that they may be formed into non-tacky films, which thus do not present problems arising from self-sticking in reeling and storage. Another advantage of the ethylene/hydroxyethyl methacrylate copolymers of the invention is that they can be prepared from raw materials that are made by commercially established processes and are readily available. A further advantage is that their moisture resistance is such that glass laminates made with these copolymers have been found to be largely unaffected by 2 hours' immersion in boiling water or by exposure to 100% relative humidity at 50° C. for 14 days.

Within this preferred range of ethylene/hydroxyethyl methacrylate copolymers, we have found that those containing from 65% to 75% by weight of ethylene and correspondingly from 35% to 25% by weight of hydroxyethyl methacrylate, for example 72% of the former and 28% of the latter, by weight, have properties very similar to those of plasticised polyvinyl butyral in terms of flexibility at average outdoor temperatures and of adhesion to glass surfaces, and thus of suitability for use as safety glass interlayers, especially for vehicle windscreens. Plasticised polyvinyl butyral has hitherto been considered to be the best interlayer for safety glass and is widely used. However, the ethylene/hydroxyethyl methacrylate copolymers within this preferred range of 65–75:35–25 ethylene: hydroxyethyl methacrylate ratio have the advantages that they are inherently flexible and form essentially non-tacky films without plasticiser. These films do not need to be dusted with anti-tack powders, and subsequently washed and dried before use, as is the case with polyvinyl butyral sheets. The copolymers have a high elongation at break, often more than twice that of polyvinyl butyral. They are also less affected by temperature changes than is polyvinyl butyral, the latter being stiffer at temperatures somewhat below 20° C. and more flexible at temperatures somewhat above 20° C., than are the ethylene/hydroxyethyl methacrylate copolymers. The latter have the further advantages described hereinbefore. Copolymers containing amounts of hydroxyethyl methacrylate ranging below about 25% by weight have (in the absence of a third monomer) decreasing transparency, while those containing more than about 35% by weight tend to give somewhat tacky films.

Other copolymers provided and useful in accordance with the invention include copolymers as described of ethylene with, for example, glycidyl acrylate or methacrylate, glycerol monoacrylate or monomethacrylate, and hydroxypropyl and hydroxybutyl acrylates and methacrylates. The hydroxypropyl esters (in which the free hydroxy groups may be primary or secondary or a mixture thereof) have the advantage of relatively low cost. As already indicated, the epoxy comonomers, for example glycidyl methacrylate, confer on the copolymer substantially stronger bonding to glass surfaces than does hydroxyethyl methacrylate. These thus need to be used in smaller proportions than hydroxyethyl methacrylate, to achieve, for example, the same optimum degree of adhesion in safety glass, and a third comonomer may then be required to maintain the desired light transmission or transparency.

While it is often desirable to select a combination of comonomers giving the highest obtainable transparency combined with a desired degree of adhesion to the glass, this is not necessarily the case. For example, in laminated glass for use in the building industry, for such applications as door and wall panels, the interlayer may be required to impart a frosted, dimmed, decorative or coloured effect, or to have wires embedded therein. In such cases, high transparency is generally not of great importance; indeed, pigments may be added to the copolymer to achieve a desired effect. For such applications, moreover, the degree of adhesion required may be different and is in general less critical than in safety glass for vehicle windscreens, where it is usually required to meet a specification providing adhesion sufficient for the glass fragments to be held, but not so great as to prevent "bagging" of the fractured laminate to allow a missile to be held and decelerated.

Other factors also deserve consideration. The comonomers described are at present more expensive than ethylene, so that an increase in comonomer content increases cost of the product. But an increase in comonomer content up to about 45% reduces crystallinity, detectable by X-ray methods, which in turn increases the flexibility and generally the transparency of the product. However, increasing the comonomer content too far may result in the product having too low an impact strength for the copolymer to be used in a particular laminate application.

It will thus be appreciated that the choice of copolymer composition may involve a compromise between conflicting property requirements in the finished laminate.

The adhesion of the bonding layer to the glass may also be affected by the time cycles and temperatures used in the manufacture of the glass laminate. Transparency may be affected particularly by the method of cooling applied in the manufacturing process, as will be described hereinafter.

The proportions of a particular comonomer or comonomers giving, with the ethylene, an optimum balance of properties for a given application, and for use in a given process, are, therefore, determined by experiment. Thus, for safety glass for vehicle windscreens the preferred ethylene/hydroxyethyl methacrylate copolymers have been found to lie within the range of 18% to 40%, by weight, hydroxyethyl methacrylate content, as set forth hereinbefore. It will be appreciated, however, that it is a matter of ordinary scientific skill to match these copolymers by varying the combination and proportions of the comonomers present in the copolymer, within the limits set out hereinbefore. For example, a similar combination of properties may be expected if at least a part of the hydroxyethyl methacrylate be replaced by a mixture of a smaller amount of an epoxy monomer and a compensating amount of methyl methacrylate or other such further comonomer.

The copolymers may be prepared by the known process of ethylene polymerisation at high pressure, the mixture of comonomers being polymerised at a pressure above 500 atmospheres, in the presence of a free radical polymerisation initiator, and at elevated temperature, suitably 120° to 250° C. The monomers are introduced in the proportions found to give the desired proportions in the copolymer under the conditions of reaction. Thus, for example, a product containing about 30% of hydroxyethyl methacrylate may be obtained from a feed mixture containing about 5% of this monomer, which has a much higher reactivity than ethylene. Generally the process is operated continuously in a stirred or tubular reactor, but it may be operated as a batch process. For making copolymers of highest transparency, such as are desirable for safety glass for vehicle windscreens, product homogeneity is important and hence the use of a well stirred, continuous reactor is preferred for the manufacture of these copolymers. The melt flow index of the copolymer is controlled by the normal methods used in the high pressure ethylene polymerisation process, account being taken of the fact that some of the comonomers, including hydroxyethyl methacrylate, themselves show chain transfer activity. The melt flow index is selected to give a desired amount of melt flow during the glass lamination process; a melt flow index of from 0.2 to 20 is generally preferred. Free monomer (which might cause bubbling during the lamination process) may be removed from the product by evacuation or aeration.

The glass laminates of the invention may be made by any of the conventional methods, using the ethylene copolymer as the interlayer. In general, these methods consist of forming a sandwich of the sheets to be joined with a layer or layers of the copolymer between them, and applying heat and pressure to effect bonding. Preferably the sandwich is formed by placing a pre-formed film of the copolymer between the surfaces to be bonded, especially when these are curved. Alternatively, the copolymer may be applied to one or both of the surfaces from solution or, in the case of flat sheet laminates, a film of the copolymer may be extruded directly on to one or both of the surfaces to be bonded, or may be formed thereon by melt spreading.

In the conventional glass laminating processes the sandwich is formed by placing a pre-formed film between the surfaces. Polyvinyl butyral films as supplied for this purpose have at least one surface formed with ridges thereon; this facilitates handling of the film, particularly its positioning against the glass, since blocking between the film and glass surfaces is prevented. Films of the copolymers of the present invention may be similarly ridged, or otherwise roughened so as to prevent blocking. For example, films of the copolymers 0.03 inch thick may suitably be provided with parallel ridges about 0.001 inch high and at about 50 per inch spacing. The film may be formed by conventional melt extrusion methods and subsequently embossed under heat, on one or both surfaces, by means of embossing rollers. When a chilled casting roll is used, this may be suitably embossed to provide a desired surface configuration on one side of the film, the film being pressed thereon by a resilient roller. The provision of the copolymer in the form of a self supporting film, preferably provided with a ridged or otherwise roughened surface configuration for the purpose described, is a further feature of the present invention.

In a widely used process for the production of safety glass, and suitable for making the laminates of this invention, the sheets of glass with the film interlayer interposed between them are assembled in a suitable jig, and the assembly is placed in a flexible bag of plastics or rubber. The bag is then thoroughly evacuated, and the assembly is placed in an oven, or, preferably, in an air or oil autoclave, and heated to the desired bonding temperature. For the copolymers of the present invention this is generally above 110° C., preferably between 120° and 130° C. for a heating period of about 60 minutes, but higher temperatures and different time cycles may be used. The pressure of the atmosphere, when an oven is used, or the pressure applied in the autoclave, provides for uniform contact and bonding between the glass sheets and the interlayer. The assembly is then cooled or allowed to cool before its removal from the bag.

To obtain maximum transparency of the copolymers, the laminate is preferably cooled as rapidly as is possible without risk of causing breakage of the glass. Alternatively, if it is more convenient to allow the laminate to cool slowly, full transparency may be restored by reheating the laminate to a temperature of about 120° C. and then rapidly cooling it. In either case, the laminates may be cooled by plunging them into liquid cooling medium, usually water, suitably at about 40° C. Cooling may alternatively be accomplished by means of blasts of cold air.

The laminates may also be made by applying heat and pressure in a mechanical or hydraulic press, with heating and cooling applied by heat transfer through the platens. The bag and autoclave method is generally much preferred for making laminates of high quality, particularly for making curved laminates.

The glass surfaces to be bonded may if desired be treated with an adhesion promoter before the sandwich is assembled.

The thickness of the glass and copolymer layers is not critical to success in making glass laminates in accordance with the invention. Safety glass for vehicle windscreens, however, generally consists of two layers of glass of thickness within the range of 1/8 inch to 1/4 inch, with an interlayer about 0.015 inch to 0.035 inch thick. For example, the glass sheets are suitably 1/8 inch thick, and the interlayer 0.030 inch thick. Bandit-resistant glass may consist of, for example, a 1/4 inch thick sheet of the substantially rigid plastic material with a 1/16 inch thick glass sheet bonded to each surface by a 1/16 inch thick interlayer of copolymer.

In addition to their use in such applications as for vehicle windscreens, bandit-resistant glass and building components already mentioned, the glass laminates of the invention have various other applications. For example, they may be formed as, or used in the construction of, transparent or translucent lighting fittings. For this application they have the advantages that the copolymer layer will resist penetration by missiles and so will often prevent breakage by vandals of lamps shielded by such fittings. Moreover, the copolymer layer will usually remain intact when the glass is cracked or broken (unless by major damage), so that a gas tight casing may be maintained around the lamp, thus reducing the risk of fire when inflammable gases or materials are in the vicinity of the lamp.

Our invention is illustrated but in no way limited by the following examples, in which parts given are by weight unless otherwise stated. Densities of the copolymers were measured by the density gradient column method of BS 2782:Part 5:1965 (Method 509B). Melt Flow Index was measured by the method of BS 2782:Part 1:1965 (Method 105C: Procedure A).

EXAMPLE 1

To a 350 ml. vigorously stirred high pressure reactor were continuously fed ethylene at 5.55 kg./hr. and hydroxyethyl methacrylate at 0.16 kg./hr., the pressure being maintained at 2000 kg./cm.² A 2% solution of nonanoyl peroxide in petroleum ether of boiling point 60–80° C. was used to promote reaction and the temperature was automatically controlled at 190° C. The product, 0.47 kg./hr., was collected as a white powder having a melt flow index of 2 dg./min. and a density of 0.971 gm./cc. It had a hydroxyethyl methacrylate content of 26% (3.40% free hydroxy groups).

An experimental glass laminate with the copolymer was then prepared. A sample of the copolymer was milled for 10 minutes with 200 p.p.m. of 4,4'-thiobis(3-methyl-6-t-butyl phenol), as antioxidant, at 110° C. to 120° C., and the resultant crêpe was pressed at 130° C. to 140° C. to form a non-tacky film having a thickness of 0.015 inch. A portion of this film was then sandwiched between two pieces of glass 1/8 inch thick and 1 foot square in size, and the assembly was pressed in a hydraulic press at 120 p.s.i. for 30 minutes at 135° C., to form an experimental laminated safety glass. The product on impact from a 1/2 lb. steel ball, dropped from 30 feet, cracked but did not totally disintegrate. The glass laminate had a high transparency and light stability and was little affected by 2 hours' immersion in boiling water.

EXAMPLE 2

Under similar conditions to those described in Example 1, 6.7 kg./hr. of ethylene and 0.36 kg./hr. of hydroxyethyl methacrylate were polymerised in a stirred reactor. In this case the product, obtained at a rate of 0.79 kg./hr., had a melt flow index of 20 dg./min., a hydroxyethyl methacrylate content of 34% (4.44% free hydroxy groups) and a density of 0.987 gm./cc. It was used in the same manner as the product of Example 1 and the resultant experimental glass laminate had essentially similar properties.

EXAMPLE 3

Using a similar technique to that described in Examples 1 and 2, ethylene was fed continuously to the reactor at 7.35 kg./hr. and hydroxyethyl acrylate at 0.27 kg./hr., the pressure being maintained at 1600 kg./cm.² and the temperature at 190° C. The product, 0.86 kg./hr., was obtained in powder form and contained 23% combined hydroxyethyl acrylate (3.37% free hydroxy groups). It had a melt flow index of 1.6 dg./min., and adhered to glass similarly to the copolymers obtained as described in Examples 1 and 2.

EXAMPLE 4

By the process described in the previous examples ethylene containing 1 mole percent of propane as chain transfer agent was added continuously to the reactor at 6.7 kg./hr. and glycidyl methacrylate at 0.18 kg./hr., the pressure being maintained at 1600 kg./cm.² and the the temperature at 190° C. A transparent product containing 22% combined glycidyl methacrylate (2.48% epoxy oxygen) was obtained at 0.68 kg./hr.; it had a melt flow index of 2 dg./min. and adhered strongly to glass.

EXAMPLE 5

This example is provided to illustrate the effect of quenching on the transparency of glass laminate samples.

A copolymer of ethylene and hydroxyethyl methacrylate containing 31% of the latter (4.05% free hydroxy groups) was pressed into sheet form 0.030 inch thick at a temperature of 130° C. Samples 2½ inch square were cut from this sheet and made into glass/copolymer/glass laminates as previously described, using 1/8 inch thick glass. Two samples were heated to 120° C. and one was then cooled by plunging it into water at 40° C., and the other was allowed to cool naturally to ambient temperature by exposure to the atmosphere.

The luminous transmittance was determined according to ASTM 1746–62T and the haze determined according to ASTM D–1003.

|  | Quenched | Natural cooling |
|---|---|---|
| Percent transmission ASTM 1746 | 99 | 96 |
| Haze percent ASTM D-1003 | 1 | 4 |

EXAMPLE 6

This example is provided to show the effect of cooling rate on the transparency of glass/copolymer laminates.

A copolymer of ethylene with 31% of hydroxyethyl methacrylate (4.05% free hydroxy groups) was pressed into sheet form approximately 0.030 inch thick. A series of 2½″ x 1¼″ pieces were cut from the sheet and assembled into sample sandwiches, each between identical pairs of glass slips ⅛ inch thick. The samples were then placed in a plasticized polyvinyl chloride film bag which was evacuated thoroughly by means of a vacuum pump, and the closed bag with the samples was heated in an oven at 120° C. for 30 minutes. The laminates were then cooled and removed from the bag, reheated to 120° C. for a further 30 minutes and then plunged into water baths maintained at a series of temperatures ranging from 30° C. to 80° C. After 10 minutes the laminates were removed and dried. Optical measurements were then made. The light used was mercury green (5461 A.) and transmittance was measured on the samples immersed in dialkylphthalate (Refractive Index $n_D = 1.518$) to cut out surface reflections. The results shown in Table 1 were obtained.

TABLE I

| Temperature of quenching water (° C.) | 80 | 70 | 60 | 50 | 40 | 30 |
|---|---|---|---|---|---|---|
| 1. Luminous transmission (ASTM D 1746-62T) (Corrected to interlayers 1 mm. thick), percent | 85.5 | 89.5 | 92 | 93 | 95 | 96 |
| 2. Scattering coefficient (Turbidity), cm.$^{-1}$ | 1.55 | 1.15 | 0.85 | 0.75 | 0.50 | 0.33 |
| 3. Forward scattering fraction (DIN 5036), percent | 2.0 | 0.5 | 0.35 | 0.3 | 0.1 | 0.1 |

EXAMPLE 7

Sandwiches 12 inches square were assembled in which a sheet of a transparent substantially rigid plastics material ⅛ inch thick was placed between two sheets of ⅛ inch thick glass and separated from each by an interposed sheet of an ethylene copolymer 0.030 inch thick. The copolymer contained 31% by weight of hydroxyethyl methacrylate (4.05% free hydroxy groups) and the rigid plastic materials used were:

(a) Polymethyl methacrylate
(b) Polyvinyl chloride
(c) Polystyrene

The sandwiches were placed in plasticised polyvinyl chloride film bags, the bags were evacuated for 30 minutes, and the bags with the enclosed sandwiches were heated in an oven for 60 minutes at 120° C. They were removed from the oven and allowed to cool to ambient temperature by exposure to the atmosphere. On removal from the bags, the laminates were found to have high transparency and the glass was firmly bonded to the central rigid plastic material.

EXAMPLES 8–12

By the polymerisation technique used in Example 1, tercopolymers of ethylene with: hydroxyethyl methacrylate (HEMA) and methyl methacrylate (MMA) (Example 8); hydroxyethyl methacrylate and lauryl methacrylate (LMA) (Example 9); glycidyl methacrylate (GMA) and methyl methacrylate (Examples 10 and 11); and hydroxyethyl methacrylate and glycidyl methacrylate (Example 12) were prepared. Details are given in Table II. These tercopolymers, which all contained about 70% ethylene, adhered strongly to glass when tested in the manner described in Example 1, and showed high luminous transmission. As with the ethylene/hydroxyethyl methacrylate copolymer, the luminous transmission was improved by rapid cooling.

TABLE II

| Example | 8 | 9 | 10 | 11 | 12 |
|---|---|---|---|---|---|
| Ethylene feed (kg./hr.) | 8.4 | 8.65 | 8.57 | 8.2 | 7.88 |
| Hydroxyethyl methacrylate feed (kg./hr.) | 0.12 | 0.34 | | | 0.33 |
| Methyl methacrylate feed (kg./hr.) | 0.24 | | 0.31 | 0.23 | |
| Glycidyl methacrylate feed (kg./hr.) | | | 0.06 | 0.12 | 0.017 |
| Lauryl methacrylate feed (kg./hr.) | | 0.11 | | | |
| Copolymer production rate (kg./hr.) | 0.89 | 1.03 | 0.85 | 0.87 | 1.10 |
| Melt flow index of copolymer (dg./min.) | 3.5 | 1.8 | 1.75 | 0.6 | |
| Density (g./cc.) of copolymer | 0.9543 | | 0.9497 | 0.9550 | |
| Percent monomer in product (all 70% ethylene) | HEMA, 10; MMA, 20 | HEMA, 23; LMA, 7 | MMA, 25; GMA, 5 | MMA, 20; GMA, 10 | HEMA, 28; GMA, 2 |
| Percent free hydroxy and/or epoxy oxygen | Hydroxy, 1.31 | Hydroxy, 3.0 | Epoxy, 0.56 | Epoxy, 1.13 | Hydroxy, 3.73; Epoxy, 0.117 |

EXAMPLES 13–14

Terpolymers of ethylene with hydroxyethyl methacrylate and vinyl acetate were prepared and tested in the same manner as that described for the terpolymers in Examples 8–12. Details are given in Table III. The test laminates again showed strong adherence of the copolymer to the glass, and high luminous transmission.

TABLE III

| Example | 13 | 14 |
|---|---|---|
| Ethylene feed (kg./hr.) | 7.26 | 7.11 |
| Hydroxyethyl methacrylate feed (kg./hr.) | 0.27 | 0.24 |
| Vinyl acetate feed (kg./hr.) | 0.34 | 0.29 |
| Copolymer production rate (kg./hr.) | 0.72 | 0.69 |
| Melt flow index (dg./min.) | 5.2 | 3.6 |

EXAMPLE 15

Using reaction conditions of pressure 2000 kg./cm.$^2$ and temperature 180° C., with monoanoyl peroxide as catalyst, ethylene was fed to the reactor at 8.4 kg./hr. and hydroxypropyl methacrylate at 0.32 kg./hr. The product, which was obtained at a rate of 0.84 kg./hr., had a combined hydroxypropyl methacrylate content of 30% (3.54% free hydroxy) and a melt flow index of 2.3 dg./min.

Although this copolymer gave a substantially transparent laminate between glass, this laminate did not resist the impact of a 5 lb. steel ball dropped from 12 ft. and thus was inferior for use as a safety glass for vehicle windscreens to laminates having as an interlayer a copolymer of ethylene with about 30% hydroxyethyl methacrylate. Its performance, however, was very satisfactory for use in accordance with the invention in applications imposing less stringent requirements as to the impact strength of the laminates.

I claim:

1. A glass laminate that includes at least one layer of glass adhered to a layer of a copolymer of ethylene with at least one monoester selected from the hydroxy and epoxy lower aliphatic monoesters of acrylic and methacrylic acids, and with from 0% to 55%, by weight of the copolymer, of a further comonomer having one ethylenic double bond and selected from esters of acrylic and methacrylic acids and vinyl esters, said copolymer containing, by weight, at least 35% of ethylene and:
   (a) from 1.0% to 8.5% of free hydroxy groups; or
   (b) from 0.10% to 3.0% of epoxy oxygen; or
   (c) both free hydroxy groups up to 8.5% and epoxy oxygen up to 3.0%, provided that: the weight of free hydroxy groups + (10× the weight of epoxy oxygen) is always at least 1% by weight of the copolymer.

2. The glass laminate of claim 1 wherein the copolymer contains from 2.0% to 6.0%, by weight, of free hydroxy groups.

3. The glass laminate of claim 1 wherein the copolymer contains from 0.3% to 1.0% of epoxy oxygen.

4. The glass laminate of claim 1 wherein the hydroxy or epoxy lower aliphatic radical of said monoester of said copolymer contains from 2 to 6 carbon atoms.

5. The glass laminate of claim 1 wherein the copolymer contains a further comonomer selected from the group consisting of vinyl acetate, alkyl acrylate or alkyl methacrylate.

6. The glass laminate of claim 1 wherein the monoester of said copolymer is glycidyl monoacrylate or glycidyl monomethacrylate.

7. The glass laminate of claim 1 comprising two sheets of glass bonded together by a layer of said copolymer.

8. The glass laminate of claim 1 comprising one sheet or glass bonded to a sheet of trasnparent or translucent, substantially rigid plastic material by a layer of said copolymer.

9. The glass laminate of claim 8 wherein said transparent or translucent, substantially rigid plastic material is an acrylic resin, polyvinyl chloride, polystyrene or a polycarbonate.

10. A glass laminate of claim 9 wherein said transparent or translucent, substantially rigid plastic material is polymethyl methacrylate.

11. The glass laminate of claim 1 wherein the monoester of said copolymer is a hydroxy alkyl or hydroxycycloalkyl ester.

12. The glass laminate of claim 11 wherein the monoester is hydroxyethyl methacrylate.

13. The glass laminate of claim 12 wherein the copolymer consists essentially of ethylene and from 18 to 40%, by weight of the copolymer, of hydroxyethyl methacrylate.

14. The glass laminate of claim 13 wherein the copolymer consists essentially of ethylene and from 25 to 35%, by weight of the copolymer, of hydroxyethyl methacrylate.

15. The glass laminate of claim 13 comprising two sheets of glass bonded together by a layer of said copolymer.

References Cited

UNITED STATES PATENTS

| | | | |
|---|---|---|---|
| 2,464,826 | 3/1949 | Neher et al. | 161—199 X |
| 2,783,176 | 2/1957 | Boicey | 161—248 X |
| 2,962,471 | 11/1960 | Lang et al. | 260—45.4 |
| 3,325,431 | 6/1967 | McManus | 161—159 X |
| 3,344,014 | 9/1967 | Rees | 161—203 |
| 3,382,137 | 5/1968 | Schreiber et al. | 156—99 X |
| 3,388,034 | 6/1968 | McCombie | 161—183 |
| 3,406,086 | 10/1968 | Foster | 161—183 |

HAROLD ANSHER, Primary Examiner

U.S. Cl. X.R.

156—104, 106, 311; 161—185, 195, 204; 260—80.75, 80.76